United States Patent [19]
Etherton et al.

[11] Patent Number: 4,634,746
[45] Date of Patent: Jan. 6, 1987

[54] POLYMERIZATION CATALYST, PRODUCTION AND USE (P-1010)

[75] Inventors: Bradley P. Etherton, Houston; Malcolm J. Kaus, Humble, both of Tex.

[73] Assignee: Exxon Research & Engineering Co., Florham Park, N.J.

[21] Appl. No.: 777,393

[22] Filed: Sep. 18, 1985

Related U.S. Application Data

[62] Division of Ser. No. 637,641, Aug. 3, 1984, Pat. No. 4,565,797.

[51] Int. Cl.$^4$ .......................... C08F 4/62; C08F 4/64; C08F 4/68; C08F 4/70
[52] U.S. Cl. .................................. 526/124; 526/127; 526/128; 526/129; 526/137; 526/348.6
[58] Field of Search ............... 526/128, 129, 137, 142, 526/124, 127

[56] References Cited

U.S. PATENT DOCUMENTS

| | | | |
|---|---|---|---|
| 3,787,384 | 1/1974 | Stevens et al. | 526/129 X |
| 4,244,838 | 1/1981 | Gessell | 526/142 X |
| 4,252,670 | 2/1981 | Caunt | 526/125 X |
| 4,325,835 | 4/1982 | Hartshorn | 526/114 X |
| 4,431,568 | 2/1984 | Miya et al. | 526/128 X |
| 4,451,574 | 5/1984 | Johnson | 526/137 X |

FOREIGN PATENT DOCUMENTS 0032307 7/1981 European Pat. Off. .

Primary Examiner—Patrick P. Garvin
Attorney, Agent, or Firm—M. B. Kurtzman

[57] ABSTRACT

Ethylene and alpha-olefins are homopolymerized or copolymerized with another olefin monomer in the presence of a catalyst system comprising an organo metal cocatalyst and a treated titanium-containing catalyst component, said titanium-containing catalyst component being obtained by reacting together a porous particulate material, an organic magnesium compound, an oxygen containing compound, a halogen, interhalogen compound or halosilane and titanium tetrachloride.

24 Claims, No Drawings

POLYMERIZATION CATALYST, PRODUCTION AND USE (P-1010)

This is a division of application Ser. No. 637,641 filed 08/03/84 and now U.S. Pat. No. 4,565,797.

BACKGROUND OF THE INVENTION

This invention relates to a novel solid catalyst component to be employed with a cocatalyst for use in the polymerization of olefins to polyolefins such as polyethylene, polypropylene and the like, or copolymers such as ethylene copolymers with other alpha-olefins and diolefins, which catalyst component shows unusually high activity and excellent hydrogen response for the control of polymer molecular weight. The polymer product obtained evidences an important balance of polymer properties, for example, the catalyst system obtains a polymer with a narrow molecular weight distribution and an improved balance in polymer product machine direction tear strength and transverse direction tear strength. As a result, the blown film produced from the polymer product manifests an overall higher strength.

The catalyst component comprises a solid reaction product obtained by contacting a solid, particulate, porous support material such as, for example, silica, alumina, magnesia or mixtures thereof, for example, silica-alumina, in stages with an organometallic composition treated with an alcohol, a transition metal compound, a halogen containing compound, halogen or interhalogen and treating the solid with an organoaluminum compound. The novel catalyst component, which when used with an aluminum alkyl cocatalyst, provides the novel catalyst system of this invention which can be usefully employed for the polymerization of olefins.

The catalyst system can be employed in slurry, single-phase melt, solution and gas-phase polymerization processes and is particularly effective for the production of linear polyethylenes such as high-density polyethylene and linear low density polyethylene.

Recently, interest has arisen in the use of magnesium-titanium complex catalyst components for the polymerization of olefins. For example, European Patent Application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica but otherwise the disclosure is similar to the above-discussed European patent application.

U.S. Pat. No. 4,250,288 discloses a catalyst which is the reaction product of a transition metal compound, an organomagnesium component and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. Nos. 4,004,071 and 4,276,191.

U.S. Pat. Nos. 4,173,547 and 4,263,171, disclose respectively a catalyst component comprising silica, an organoaluminum compound, titanium tetrachloride and dibutyl magnesium; a catalyst component comprising a magnesium alkyl-aluminum alkyl complex plus titanium halide on a silica support.

The use of chlorine gas in polymerization processes are taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a cocatalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like.

Each of U.S. Pat. Nos. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the advantages taught in this invention.

The catalyst systems comprising magnesium alkyls and titanium compounds, although useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, and do not show an extremely high catalytic activity. Furthermore, with such catalysts one obtains polymer product whose film properties are unbalanced under anisotropic conditions.

In U.S. Pat. No. 4,451,574 issued May 29, 1984 a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer product.

In accordance with this invention catalyst combinations have been found which have extremely high catalytic activities, good comonomer incorporation, and excellent hydrogen responsiveness for the control of molecular weight and obtain polymer product with greatly improved film properties. The resins exhibit excellent melt strength with a surprising decrease in power consumption, hence an increase in extrusion rates, as well as excellent MD tear strength in excess of 80 g/mil and dart impact strength in excess of 70 g/mil with a 1.0 dg/min and 0.918 g/cc density film.

The new catalyst systems and catalyst component of this invention are obtained by contacting an organometallic compound, an alcohol, aldehyde, ketone, siloxane or mixtures thereof, a transition metal compound and a halide containing compound, halogen or interhalogen compound in the presence of an oxide support and treating the obtained solid with an organoaluminum compound. The catalyst system employing the transition metal containing catalyst component is advantageously employed in a gas phase ethylene polymerization process since there is a significant decrease in reactor fouling as generally compared with prior art ethylene gas phase polymerization processes thereby resulting in less frequent reactor shut downs for cleaning.

SUMMARY OF THE INVENTION

In accordance with the objectives of this invention there is provided a transition metal containing catalyst component for the polymerization of alpha-olefins comprising a solid reaction product obtained by treating an inert solid support material in an inert solvent sequentially with (A) an organometallic compound of a Group IIa, IIb or IIIa metal of the Periodic Table wherein all the metal valencies are satisfied with a hydrocarbon or substituted hydrocarbon group, (B) an oxygen containing compound selected from ketones, aldehydes, alcohols, siloxanes or mixtures thereof, (C) optionally one or more halogen containing compounds selected from chlorosilanes and/or $Cl_2$, $Br_2$ or interhalogens, (D) at least one transition metal compound of a Group IVb, Vb, VIb VIIb or VIII metal of the Periodic Table, (E) optionally $Cl_2$, $Br_2$ or an interhalogen, and (F) treating the transition metal containing component with an organometallic compound of a Group IIa, IIb, or IIIa metal, with the proviso that if a chlorosilane is not employed in step (C), then a $Cl_2$, $Br_2$ or interhalogen is employed in at least one of steps (C) or (E) and with the further proviso that the inert solid support material can alternatively be treated with (i) the (A) organometallic compound and the (B) oxygen containing compound simultaneously, (ii) the reaction product of the (A) organometallic compound and (B) oxygen containing compound or (iii) the (B) oxygen containing compound followed by treating with the (A) organometallic compound.

The solid transition metal containing catalyst component when employed in combination with a cocatalyst such as an alkyl aluminum cocatalyst provides a catalyst system which demonstrates a number of unique properties that are of great importance in the olefin polymerization technology such as, for example, extremely high catalytic activity, the ability to control the molecular weight during the polymerization reaction as a result of the improved responsiveness to hydrogen, increased polymer yield, and reduced reactor fouling. The polymer product obtained from the polymerization of olefins and particularly ethylene manifests improved melt strength and tear strength.

In a preferred embodiment of the invention the (A) organometallic compound is a dihydrocarbyl magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups having from 1 to 20 carbon atoms, the (B) oxygen containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalkyl group, aralkyl group, alkadienyl group or alkenyl group having from 1 to 20 carbon atoms, the (D) transition metal compound is preferably a transition metal compound or combination of transition metal compounds represented by the formulas $TrX'_{4-q}(OR^7)_q$, $TrX'_{4-q}R^8_q$, $VO(OR^7)_3$ and $VOX'_3$ wherein Tr is a transition metal of Groups IVb, Vb, VIb, VIIb and VIII and preferably titanium, vanadium or zirconium, $R^7$ is an alkyl group, aryl group, aralkyl group, substituted aralkyl group having from 1 to 20 carbon atoms and 1,3-cyclopentadienyls, X' is halogen and q is zero or a number less than or equal to 4, and $R^8$ is an aryl group or aralkyl group having from 1-20 carbon atoms or a 1,3-cyclopentadienyl, and the (F) organometallic compound is an aluminum alkyl represented by $R_n^6AlX_{3-n}$ wherein X is a halogen, or hydride and $R^6$ is a hydrocarbon group selected from alkyl group, aryl group, cycloalkyl group, aralkyl group, alkadienyl group or alkenyl group having from 1 to 20 carbon atoms and $1 \leq n \leq 3$. In a particularly preferred embodiment of the invention the (A) organometallic compound and the (B) oxygen containing compound are reacted together prior to contact with the inert support.

All references to the Periodic Table are to the Periodic Table of the Elements printed on page B-3 of the 56th Edition of Handbook of Chemistry and Physics, CRC Press (1975).

Although, in accordance with this invention, the order of addition in ingredients in forming the transition metal containing catalyst component can vary (with the exception of the step (F) which must be last) the catalyst component is preferably prepared by first reacting the (A) organometallic compound with the (B) oxygen containing compound and contacting the reaction product with the inert solid support material which is preferably a Group IIa, IIIa, IVa or IVb metal oxide, or a finely divided polyolefin or other suitable support material and thereafter subjecting the system to treatment with the halogen containing compound followed by the transition metal compound. In an alternative preferred embodiment the halogen treatment can be performed after the transition metal compound treatment.

In a second embodiment of this invention there is provided a catalyst system comprising the transition metal containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprise the treated solid reaction product of (A) an organometallic composition, (B) an oxygen containing compound, (D) at least one transition metal compound and (C) and/or (E) halide containing halogen or interhalogen compound in the presence of an oxide support material which obtained solid is treated with an organometallic compound of a Group IIa, IIb or IIIa metal. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, silica, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material in an inert hydrocarbon solvent, such as, for example, heptane. During the dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but non-limiting examples of magnesium compounds which may be suitably employed in accordance with the invention are diethylmagnesium, dipropylmagnesium, di-isopropylmagnesium, di-n-butylmagnesium, di-isobutylmagnesium, diamylmagnesium, dioctylmagnesium, di-n-hexylmagnesium, didecylmagnesium, and didodecylmagnesium, dicycloalkylmagnesium, such as dicyclohexylmagnesium, dibenzylmagnesium, ditolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butylmagnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are as generally obtained from commercial sources as mixtures of the magnesium hydrocarbon compounds with a minor amount of aluminum hydrocarbyl compound. The minor amount of aluminum hydrocarbyl is present in order to facilitate solubilization of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylenes, etc.

The organomagnesium complex with a minor amount of aluminum alkyl can be represented by the formula $(R^1MgR^2)_p(R_3^6Al)_s$ wherein $R^1$, $R^2$ and $R^6$ are defined as above and p is greater than 0. The ratio of $s/s+p$ is from 0 to 1, preferably from 0 to about 0.7 and most desirably from about 0 to 0.1.

Illustrative examples of the magnesium aluminum complexes are $[(n-C_4H_9)(C_2H_5)Mg][(C_2H_5)_3Al]_{0.02}$, $[(nC_4H_9)_2Mg][(C_2H_5)_3Al]_{0.013}$, $[(nC_4H_9)_2Mg][(C_2H_5)_3Al]_{2.0}$ and $[(nC_6H_{13})_2Mg][(C_2H_5)_3Al]_{0.01}$. A suitable magnesium aluminum complex is Magala ® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen containing compounds which may be usefully employed in accordance with this invention are alcohols, aldehydes, ketones and siloxanes. Preferably the oxygen containing compounds are selected from alcohols and ketones represented by the formulas $R^3OH$ and $R^4COR^5$ wherein $R^3$ and each of $R^4$ and $R^5$ which may be the same or different can be alkyl groups, aryl groups, cycloalkyl groups, aralkyl groups, alkadienyl groups, or alkenyl groups having from 2 to 20 carbon atoms. Preferably the R groups will have from 2 to 0 carbon atoms. Most preferably the R groups are alkyl groups and will have from 2 to 6 carbon atoms. Illustrative examples of alcohols which may be usefully employed in accordance with this invention are ethanol, isopropanol, 1-butanol, t-butanol, 2-methyl-1-pentanol, 1-pentanol, 1-dodecanol, cyclobutanol, benzyl alcohol, and the like; diols, such as 1,6-hexanediol, and the like with the proviso that the diol be contacted with the magnesium compound subsequent to the magnesium compound treatment of the support material. The most preferred alcohol is 1-butanol.

The ketones will preferably have from 3 to 11 carbon atoms. Illustrative ketones are methyl ketone, ethyl ketone, propyl ketone, n-butyl ketone and the like. Acetone is the ketone of choice.

Illustrative of the aldehydes which may be usefully employed in the preparation of the organomagnesium compound include formaldehyde, acetaldehyde, propionaldehyde, butanal, pentanal, hexanal, heptanal, octanal, 2-methylpropanal, 3-methylbutanal, acrolein, crotonaldehyde, benzaldehyde, phenylacetaldehyde, o-tolualdehyde, m-tolualdehyde, and p-tolualdehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosiloxanes, polymethylethylsiloxanes, polymethyloctylsiloxanes, and polyphenylhydrosiloxanes.

The transition metal compounds which can be usefully employed in the preparation of the transition metal containing catalyst component of this invention are well known in the art. The transition metals which can be employed in accordance with this invention may be represented by the formulas $TrX'_{4-q}(OR^7)_q$, $TrX'_{4-q}R^8_q$, $VOX'_3$ and $VO(OR^7)_3$. Tr is a Group IVb, Vb, VIb, VIIb, and VIII metal, preferably Group IVb and Vb metals and preferably titanium, vanadium or zirconium, q is 0 or a number equal to or less than 4, X' is halogen and $R^7$ is a hydrocarbyl or substituted hydrocarbyl group, for example, alkyl, aryl or cycloalkyl having from 1 to 20 carbon atoms and $R^8$ is an alkyl group, aryl group, aralkyl group, substituted aralkyl group, 1,3-cyclopentadienyls and the like. The aryl, aralkyls and substituted aralkyls contain from 1 to 20 carbon atoms preferably 1 to 10 carbon atoms. Mixtures of the transition metal compounds can be employed if desired.

Illustrative examples of the transition metal compounds include: $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed with no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The step (C) and/or (E) treatment with a halogen containing compound is accomplished with a halosilane, halogen, interhalogen, or mixture thereof. The halosilanes most usefully employed in accordance with this invention are represented by the formula $R_b^9SiX''_{(4-b)}$ wherein b is less than 4 and greater than 0, $R^9$ is hydrogen or a hydrocarbyl group, and preferably an alkyl group containing from 1 to 10 carbon atoms, most preferably 1 to 6 carbon atoms or an aryl, alkaryl or aralkyl group containing from 6 to up to 18 carbon atoms, and $X''$ is a halogen selected from chlorine, bromine and iodine. Most preferred is chlorine.

Illustrative of the silanes which may usefully be employed in accordance with this invention are trichlorosilane, chlorotrimethylsilane, dichlorodimethylsilane, dichlorodiethylsilane, dichlorodibutylsilane, trichlorobutylsilane, trichloromethylsilane, tribromosilane, bromotrimethylsilane and the like. Preferably $R^9$ is hydrogen or a methyl group. The most preferred halosilane is trichlorosilane.

The halogens which can be suitably employed in accordance with this invention are $Cl_2$, $Br_2$, $I_2$ and mixtures thereof. Illustrative interhalogen compounds are ClF, $ClF_3$, BrF, $BrF_3$, $BrF_5$, ICl, $ICl_3$ and IBr. The preferred halogens are $Cl_2$ and $Br_2$. Most preferably $Cl_2$ is employed. The preferred interhalogens contain Cl.

In accordance with this invention, either step (C) or step (E) or both must be employed in the preparation of the catalyst. Preferably $Cl_2$ will be employed as the compound of choice for the halogenation treatment. The treatment in step (C) or step (E) or both can be usefully performed in accordance with this invention. If treatment is limited to step (E) $Cl_2$ should be employed.

The transition metal containing catalyst solid is treated with an organometallic compound of a Group IIa, IIb or IIIa metal. Preferably the organometallic compound employed in the treatment step (F) is an aluminum alkyl represented by the structural formula $R_n^6AlX_{3-n}$ wherein X is halogen or hydride and $R^6$ is a hydrocarbyl group selected from $C_1$ to $C_{18}$ saturated hydrocarbon radicals and $1 \leq n \leq 3$.

Illustrative of such compounds which can usefully be employed in the treatment step (F) of this invention are $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$. Preferably the organoaluminum compound is a aluminum trialkyl where the alkyl groups can have from 1 to 8 carbon atoms and most preferably from 2 to 6 carbon atoms. Aluminum tri-n-hexyl being most preferred.

The treatment of the support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane, cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The organometallic component employed in step (A) either as the organometallic compound or its reaction product with an oxygen containing compound is preferably added to the inert solvent in the form of a solution. Preferred solvents for the organometallic compositions are the alkanes such as hexane, heptane, octane and the like. However, the same solvent as employed for the inert particulate support material can be employed for dissolving the organometallic composition. The concentration of the organometallic composition in the solvent is not critical and is limited only by handling needs.

The amounts of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the organomagnesium compound concentration is in the range of 0.5 to 2.0 millimoles/g of support and more preferably in the range of 1.0 to 1.8 millimoles/g of support. The magnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen-containing compound and the mode of addition. When the oxygen-containing compound is not premixed with the magnesium compound, that is, when it is added to the support before the magnesium compound or after the magnesium compound, the ratio may range from 0.01 to 2.0. When premixed with the organomagnesium compound, the hydrocarbyl groups on the oxygen-containing compound must be sufficiently large to insure solubility of the reaction product. Otherwise the ratio of oxygen-containing compound to organomagnesium compound ranges from 0.01 to 1.0, most preferably 0.8 to 1.0. The amount of halosilane optionally employed should be such as to provide a halogen to magnesium mole ratio of about 0.5 to about 3.0. The halogen or interhalogen treatment in either step (C) or (E) or both is such as to provide an excess of the halogen or interhalogen. Generally, the halogen employed, such as for example $Cl_2$, is employed in the form of a gas.

The halogen treatment of the catalyst can be accomplished by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can also be employed. The molar concentration of chlorine in the inert gas can range from 1 mole % to 100 mole %. The transition metal compound is added to the inert support at a concentration of about 0.01 to about 1.5 millimoles Ti/g of dried support, preferably in the range of about 0.05 to about 1.0 millimoles Ti/g of dried support and especially in the range of about 0.1 to 0.8 millimoles Ti/g of dried support.

The treatment step (F) can be accomplished by adding the treating agent to the solids in its mother liquor or the washed and dried solids can be reslurried in an appropriate solvent followed by the addition of the treating agent. The amount of agent (F) to be employed should be such as to provide a mole ratio of 0.5 to about 50 and preferably 1 to about 20 with respect to the titanium content. Most preferably the mole ratio will be about 3 to about 10.

Generally, the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the transition metal-containing solid catalyst component, washing after the completion of any step may be effected. However, it is generally found that the material advantages of the catalyst system are diminished by washing until the completion of step (F).

The catalyst components prepared in accordance with this invention are usefully employed with cocatalysts well known in the art of the Ziegler catalysis for polymerization of olefins. Typically, the cocatalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred alkylaluminum compounds are represented by the formula $AlR'''_n X''_{3-n}$ wherein $R'''$ is hydrogen, hydrocarbyl or substituted hydrocarbyl group and n is as defined herein above. Preferably $R'''$ is an alkyl group having from 2 to 10 carbon atoms. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable.

The catalyst system comprising the aluminum alkyl cocatalyst and the transition metal containing solid catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst system may be usefully employed to produce polyethylene or copolymers of ethylene by copolymerizing with other alpha-olefins or diolefins, particularly propylene, butene-1, pentene-1, hexene-1, and octene-1. The olefins can be polymerized in the presence of the catalysts of this invention by any suitable known process such as, for example, suspension, solution and gas-phase processes.

The polymerization reaction employing catalytic amounts of the above-described solid catalyst can be carried out under conditions well known in the art of Ziegler polymerization, for example, in an inert diluent at a temperature in the range of 50° C. to 120° C. and a pressure of 1 and 40 atmospheres in the gas phase at a temperature range of 70° C. to 100° C. at about 1 atmosphere to 50 atmospheres and upward. Illustrative of the gas-phase processes are those disclosed in U.S. Pat. Nos. 4,302,565 and 4,302,566, which references are hereby incorporated in their entirety by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples following the silica support was prepared by placing Davison Chemical Company G-952 silica gel in a vertical column and fluidizing with an upward flow of $N_2$. The column was heated slowly to 800° C. and held at that temperature for 12 hours after which the silica was cooled to ambient temperature.

The melt index (MI) and melt index ratio were measured in accordance with ASTM test D1238. The resin density was determined by density gradient column according to ASTM test D1505. Machine direction (MD) and transverse direction (TD) Elmendorf tear strengths were measured on film samples according to ASTM test D1922. The films were produced at a 2:1 blow-up ratio on a typical blown film line using a 2.5-inch extruder with a 6-inch die. The die gap was 120 mil and the film was drawn to 1.25 mil with an 18-inch frost line height. Die throughput was 9.5 lb./hr./inch die circumference. The bulk density was determined by allowing approximately 120 cc of resin to fall from the bottom of a polyethylene funnel across a gap of 1 inch into a tared 100 cc plastic cylinder (2.6 cm in diameter by 19.0 cm high). The funnel bottom was covered with a piece of cardboard until the funnel was filled with the sample. The entire sample was then allowed to fall into the cylinder. Without agitating the sample, excess resin was scraped away so that the container was completely filled without excess. The weight of resin in the 100 cc cylinder was determined. This measurement was repeated three times and the average value reported.

EXAMPLE 1

830 g of the dehydrated silica was slurried in 6,345 ml of isopentane at 30° C. under a nitrogen blanket. The temperature was raised to 35° C. and a 1,845 ml aliquot of a butylethylmagnesium (BEM) and butanol solution in hexane (prepared by mixing 6,000 ml of 10% BEM in hexane with 317 ml neat butanol) was added with stirring over a 30 minute period. An additional 1,957 ml of isopentane was added to the mixture and the reaction mixture was stirred for 2 hours. 47.2 g of neat $TiCl_4$ was then added to the mixture with stirring at 38° C. over a 2 minute period. The reaction mixture was stirred for 1 hour. The mixture was chlorinated at a temperature of 40° C. by the addition of $Cl_2$ gas at a constant flow rate. The flow rate was approximately 0.8 standard liters/min. The pressure in the reactor was kept at 14 psig and venting excess chlorine as necessary. The chlorine addition was maintained for 2 hours. The catalyst was then treated at a temperature of 39° C. with tri-n-hexyl aluminum (TNHAL) in isopentane for 15 minutes by the addition of 535 ml of 25% TNHAL in hexane while stirring. The reaction mixture was stirred for 1 hour. The catalyst was dried at 75° C. under flowing nitrogen. Analysis of the catalyst show that it contained 1.04% (w/w) Ti, 0.65% (w/w) Al, 2.69% (w/w) Mg and 9.92% (w/w) Cl.

Polymerization

A 36-inch fluid bed reactor, operated in a continuous manner, at 82° C. and a total pressure of 300 psig was employed to produce the ethylene-butene-1 copolymer (LLDPE). A reaction mixture comprising ethylene, butene-1 and hydrogen was circulated continuously through the bed at flow rates and relative concentration so as to produce polymers having approximately 1.0 melt index (MI) and a resin density of about 0.918 g/ml. The flow rates and relative concentrations are summarized in Table 1. The titanium-containing solid reaction product prepared above was continuously pumped at a feed rate of 2.8 g/hr. into the reactor, and a 20% triethyl aluminum (TEAL) in isopentane was continuously pumped into the reactor at a feed rate of 125 cc/hr.

Polymer product formed was removed periodically so as to maintain an essentially constant level in the reactor vessel. Polymer product collected was degassed. The results of the polymerization operating at steady state condition are set out in Table 1. The polymerization was maintained for 4 hours after steady state was achieved.

COMPARATIVE EXAMPLE 1

A titanium containing solid product was prepared identically as in Example 1 with the exception that the final TNHAL treatment was omitted.

Polymerization

The catalyst prepared above was employed for the polymerization of an ethylene-butene-1 linear low density polyethylene. The polymerization conditions and results are set out in Table 1.

COMPARATIVE EXAMPLE 2

A titanium containing catalyst solid component was prepared identically as in Example 1 with the exception that butanol was not employed in the catalyst preparation. Therefore, 216 ml of a 10% (w/w) BEM in hexane solution was used in the preparation of the solid catalyst component.

Polymerization

The conditions and the results of polymerization are set forth in Table 1.

TABLE 1

|  | Ex. 1 | Comp. Ex. 1 | Comp. Ex. 2 |
|---|---|---|---|
| Ethylene flowrate (kg/hr) | 42.3 | 28.3 | 43.1 |
| Butene flowrate (kg/hr) | 42.8 | 28.2 | 26.4 |
| $H_2$ flowrate (kg/hr) | 0.30 | 0.20 | 0.29 |
| $H_2/C_2H_4$ (molar) | 0.12 | 0.12 | 0.10 |
| $C_4H_8/C_2H_4$ (molar) | 0.51 | 0.50 | 0.33 |
| Catalyst feed rate (g/hr) | 2.8 | 16.7 | 14.8 |
| Cocatalyst feed rate (cc/hr) | 125 | 240 | 230 |
| Resin production rate (kg/hr) | 66.7 | 85.4 | 56.8 |
| Residence time (hrs) | 2.77 | 4.31 | 3.59 |
| Productivity (g/g) | 30,000 | 3,400 | 4,500 |
| Resin density (g/cc) | 0.9176 | 0.9173 | 0.9171 |
| MI (dg/min) | 1.06 | 0.92 | 0.94 |
| MIR | 29.2 | 29.7 | 34.1 |
| MD tear (g/mil) | 110 | 59 | 38 |
| TD tear (g/mil) | 441 | 473 | 746 |

The following examples show the effects of different treatment (F) conditions, and different (F) treating agents on the catalyst.

EXAMPLES 2 THROUGH 8

About 20 ml of 1-butanol were dehydrated by storage over 4A molecular sieves and sparged with nitrogen for 30 minutes in order to remove dissolved oxygen. No other purification was done.

A reaction product of butylethylmagnesium (BEM) and 1-butanol was prepared by first placing 50.0 ml of 10.2% (w/w) BEM in heptane into a clean, dry, oxygen-free 125 ml vial containing a stirring bar. A syringe needle attached to a bubbler on a low pressure nitrogen source (approximately 1" $H_2O$ pressure) was inserted through the vial septum in order to allow venting of gas. 2.99 ml of neat 1-butanol was slowly added to the vial at room temperature while stirring. The resulting colorless solution was stirred for 1 hour at room temperature. The final concentration of the solution was 0.61 mmole Mg/ml.

20.0 grams of the prepared Davison 952 silica was placed in a clean, dry, oxygen-free 1 liter flask containing a stirring bar. The silica was slurried in 400 ml of hexane which had been passed over an activated alumina column and subsequently sparged with nitrogen for 30 minutes and stored over 4A molecular sieves. 45.6 ml of the prepared BEM/butanol solution was slowly added to the 1 liter flask by syringe while the slurry was agitated at 20° C. The flask was then stirred for 1 hour at 20° C.

After 1 hour, with continuous stirring while maintaining the system at 20° C., 12.0 ml of a 0.5 mmole/ml solution of $TiCl_4$ in hexane was added dropwise to the flask by syringe. The slurry gradually turned dark brown as the $TiCl_4$ solution was added. The slurry was stirred for 1 hour at 20° C.

The sample was chlorinated by pressuring the flask to 4 psig with a 21% (v/v) chlorine in nitrogen mixture for 1 hour at 20° C. The slurry was well-stirred during this chlorination. After chlorination, the sample was sparged with nitrogen for 15 minutes in order to remove excess chlorine. The flask was taken into a dry box containing a purified nitrogen atmosphere. The contents were filtered, washed once with dry, oxygen-free, hexane, and dried under vacuum.

0.50 g samples of the solid catalyst component were slurried in 10 ml of dry, oxygen-free hexane in 30 ml vials which were clean, dry, and oxygen-free and which contained stirring bars. The samples were treated at 40° C. by addition of the quantity of aluminum alkyl or alkyl halides shown in Table 2. The treatment agents were added slowly with good stirring and stirred for one hour after the addition was complete. Following treatment, the samples were decanted, washed once with 10 ml of hexane, and again decanted. The samples were dried in a dry box under vacuum.

Polymerization 875 ml of dry, oxygen-free hexane was added to the clean, dry, oxygen-free 2 liter autoclave reactor at room temperature. 2.2 ml of 25% (w/w) tri-isobutylaluminum (TIBAL) was added to the reactor as a cocatalyst. 105 mmoles of hydrogen was added to the reactor at room temperature. The reactor was then heated to 85° C. 20 ml of butene-1 was pressured into the reactor and sufficient ethylene to bring the total reactor pressure to 150 psig. 90 mg of dry catalyst was injected into the reactor. The polymerization was conducted for 40 minutes, after which the ethylene supply was shut off, the reactor rapidly cooled to room temperature, and the resin discharged. The results of the polymerizations are shown in Table 3.

COMPARATIVE EXAMPLE 3

This example was performed as in Example 2 with the exception that the treatment step was omitted.

EXAMPLES 9 THROUGH 11

Mg alkylalcohol product was prepared as in Example 2 with the exception that the Mg compounds shown in Table 4 were substituted for BEM and the solution was diluted with dry, oxygen-free hexane to a final concentration of 0.50 mmole/ml.

5.0 grams of Davison 952 silica was placed into each of three clean, dry, oxygen-free 125 ml vials containing stirring bars. The silica was slurried in 50 ml of hexane which had been passed over an activated alumina column and subsequently sparged with nitrogen for 30 minutes and stored over 4A molecular sieves. 14.0 ml of the appropriate magnesium alkyl/butanol solution was slowly added to the vial by syringe while the slurry was stirred at 35° C. The slurry was then stirred for 1 hour at 35° C.

After 1 hour, 2.0 ml of a 0.5 mmole/ml solution of $TiCl_4$ in hexane was added dropwise to each vial by syringe. This was done while stirring at 35° C. The slurry was stirred for 1 hour at 35° C. after the addition was complete.

Each sample was chlorinated by flowing a 20% (v/v) chlorine in nitrogen mixture through the vial at 50 ml/minute for 30 minutes at 35° C. The slurry was well-stirred during the chlorination. After chlorination, the sample was sparged with nitrogen for 15 minutes in order to remove excess chlorine.

Each sample was treated at 35° C. by slow addition of 1.6 ml of 25% (w/w) TNHAL at 35° C. to the well-stirred slurry. The sample was stirred for 1 hour after the addition was complete. Each sample was dried under flowing nitrogen at 60° C.

The catalysts were tested in a manner identical to that described in Example 2 except that the amount of the appropriate catalyst used with the 25% (w/w) TIBAL solution in heptane varied as shown in Table 5. The results of the polymerizations are shown in Table 5.

EXAMPLES 12 THROUGH 16

The reaction product of different alcohols and ketones and BEM was prepared in a manner similar to that described for Example 2, except the solution was diluted with dry, oxygen-free hexane to a final concentration of 0.40 mmole/ml. After addition of the different alcohols and ketones the resulting solution was stirred for 1 hour at room temperature. The mixture of 1,6-hexanediol and 1-butanol (Example 1b) was prepared at a 0.025:1 molar ratio at 50° C. It was added to BEM and diluted with hexane to give a final magnesium concentration of 0.60 mmole/ml and a 1:1:0.025 molar ratio of BEM:1-butanol:1,6-hexanediol. The alcohols and ketones employed are listed in Table 6.

2.0 grams of Davison 952 silica was placed into each of six clean, dry, oxygen-free 50 ml vials containing stirring bars. In the case of the hexanediol catalyst, 2.0 grams of Catalyst Resources Grade 1000 silica dehydrated at 800° C. was used.

The silicas were slurried in 20 ml of hexane which had been passed over an activated alumina column and subsequently sparged with nitrogen for 30 minutes and stored over 4A molecular sieves. 7.20 ml of the reaction product of BEM and the appropriate alcohol or ketone solution was slowly added to the vial by syringe while the slurry was stirred at 20° C. The slurry was then stirred for 1 hour at 20° C.

After 1 hour, 1.2 ml of a 0.5 mmole/ml solution of $TiCl_4$ in hexane was added dropwise to each vial by syringe. This was added while stirring at 20° C. The slurry was stirred for 1 hour at 20° C. after the addition was complete.

The samples were chlorinated by pressuring the vials to 4 psig with a 21% (v/v) chlorine in nitrogen mixture for 1 hour at 40° C. The slurries were well-stirred during this chlorination. After chlorination, the samples were decanted, washed once with 20 ml of dry, oxygen-free hexane, and then reslurried in 20 ml of hexane.

Each sample was treated at 40° C. by slow addition of 1.25 ml of 25% (w/w) TNOCTAL in heptane at 40° C. to the well-stirred slurry. The sample was stirred for 1 hour after the addition was complete. The samples were decanted, washed once with 20 ml of fresh hexane, and decanted again. The samples were then dried in the dry box under vacuum.

The catalysts were tested in a manner identical to that described in Examples 1 through 7, except that 75 mg of the appropriate catalyst was used with 1.95 ml of the 25% (w/w) TIBAL solution in heptane. The results of the polymerizations are shown in Table 6.

EXAMPLES 17 THROUGH 18

Chemical dehydration of Catalyst Resources Grade 1000 silica was accomplished by treatment with dimethyldichlorosilane at 70° C. in heptane. For Example 17, 2.0 grams of Grade 1000 silica heated to 200° C. under flowing nitrogen was placed in a clean, dry, oxygen-free 50 ml vial containing a stirring bar. 20 ml of dry, oxygen-free heptane was added to the vial and it was heated to 70° C. 1.25 ml of dimethyldichlorosilane was added dropwise while stirring the slurry. A syringe needle attached to a bubbler on a low pressure nitrogen source (approximately 1" $H_2O$ pressure) was inserted through the vial septum in order to allow venting of gas. The sample was stirred for 3 hours following this addition. The sample was then cooled to room temperature and washed twice with 20 ml aliquots of hexane. The sample was then reslurried in 20 ml of hexane. The dehydration conditions for Example 18 was similar to that for Example 17 with the exception that the silica was heated to 800° C. and contacted with 0.25 ml of $(CH_3)_2SiCl_2$.

The dehydrated silicas were treated as in Example 2 except that 4.56 ml of a 0.5 mmole/ml solution of BEM/1-butanol at a 1:1 molar ratio were added.

Testing of the catalysts was performed as for Example 2, except that 67 mg and 64 mg of the catalysts prepared in Examples 17 and 18, respectively, were used with 1.95 ml of a 25% (w/w) TIBAL in heptane solution. The results of the polymerizations are shown in Table 7.

COMPARATIVE EXAMPLE 4

In order to show the effectiveness of chlorine vs. a chlorinating agent such as HCl, the preparation of Example 11 was repeated except that a 20% (v/v) mixture of HCl in nitrogen was used instead of $Cl_2$. The polymerization conditions used to test the catalyst were identical to those used in Example 2, except 1.80 ml of 25% (w/w) TIBAL in heptane were used with 75 mg of catalyst. The polymerization results of this comparative example is shown in Table 7.

EXAMPLE 19

2.0 grams of Davison 952 silica were placed into a clean, dry, oxygen-free 50 ml vial containing a stirring bar. The silica was slurried in 20 ml of hexane which had been passed over an activated alumina column and subsequently sparged with nitrogen for 30 minutes and stored over 4A molecular sieves. 5.6 ml of the reaction product of BEM and 1-butanol at a 1:1 molar ratio and at 0.5 mmole Mg/ml concentration was slowly added to the vial by syringe while the slurry was stirred at 20° C. The slurry was then stirred for 1 hour at 20° C. after the addition was complete.

The slurry was chlorinated by flowing a 50% (v/v) chlorine in nitrogen mixture through the vial at 50 ml/minute for 30 minutes at 20° C. The slurry was well-stirred during this chlorination. After chlorination, the sample was sparged with nitrogen for 15 minutes in order to remove excess chlorine.

After 1 hour, 1.2 ml of a 0.5 mmole/ml solution of $TiCl_4$ in hexane was added dropwise to the vial by syringe. This was done while stirring at 20° C. The slurry was stirred for 1 hour at 20° C. after the addition was complete.

The sample was treated at 20° C. by slow addition of 0.94 ml of 25% (w/w) TNHAL in heptane at 20° C. It was stirred for 1 hour after the addition was complete. It was then decanted, washed once with 20 ml of fresh hexane, decanted again, and finally dried in the dry box under vacuum.

The catalyst was tested in a manner identical to that described in Example 2, except that 75 mg of the catalyst was used with 1.24 ml 25% (w/w) TIBAL in heptane. 40 ml of butene-1 was added to the reactor rather than the 20 ml. The result of the polymerization is shown in Table 7.

TABLE 2

| EXAMPLE | TREATMENT AGENT[1] | QUANTITY ml | Al/Ti RATIO |
|---|---|---|---|
| 2 | TNOCTAL (24.7% (w/w) in heptane) | 0.22 | 1 |
| 3 | TNOCTAL (24.7% (w/w) in heptane) | 0.45 | 2 |
| 4 | TNOCTAL (24.7% (w/w) in heptane) | 0.90 | 4 |
| 5 | TEAL (25.1% (w/w) in heptane) | 0.14 | 2 |
| 6 | TIBAL (25.5% (w/w) in heptane) | 0.24 | 2 |
| 7 | DEAC (25.7% (w/w) in heptane) | 0.14 | 2 |
| 8 | EADC (25.9% (w/w) in heptane) | 0.14 | 2 |

[1]TEAL = triethylaluminum
TIBAL = triisobutylaluminum
TNOCTAL = tri-n-octylaluminum
DEAC = diethylaluminum chloride
EADC = ethylaluminum dichloride

TABLE 3

| EXAMPLE | YIELD (g) | SPECIFIC ACTIVITY[1] | MELT INDEX (dg/min) | MELT INDEX RATIO | RESIN DENSITY (g/cc) | BULK DENSITY (g/cc) |
|---|---|---|---|---|---|---|
| Comparative Ex. 3 | 47.0 | 116 | 0.59 | 24.7 | 0.9431 | 0.33 |
| 2 | 99.2 | 262 | 1.00 | 23.9 | 0.9406 | 0.38 |
| 3 | 111.9 | 314 | 1.57 | 27.3 | 0.9440 | 0.36 |
| 4 | 160.8 | 508 | 2.58 | 28.2 | 0.9464 | 0.35 |
| 5 | 87.2 | 228 | 1.16 | 26.9 | 0.9431 | 0.37 |
| 6 | 99.6 | 266 | 1.15 | 28.5 | 0.9443 | 0.36 |
| 7 | 282.1 | 738 | 3.56 | 28.9 | 0.9454 | 0.29 |
| 8 | 304.6 | 799 | 3.34 | 28.6 | 0.9464 | 0.31 |

[1]Units of SPECIFIC ACTIVITY are kg/g Ti/hr/(mole/l) of ethylene concentration.

TABLE 4

| EXAMPLE | MG ALKYL[1] TYPE | COCATALYST QUANTITY (ml) | CATALYST QUANTITY (mg) |
|---|---|---|---|
| 9 | BOMAG | 4.40 | 185 |
| 10 | DBM | 4.18 | 200 |
| 11 | BEM | 5.50 | 230 |

[1]BOMAG = Butyloctylmagnesium
DBM = n-Butyl-s-butylmagnesium
BEM = Butylethylmagnesium

TABLE 5

| EXAMPLE | CATALYST QUANTITY (mg) | COCATALYST QUANTITY (ml) | YIELD (g) | SPECIFIC ACTIVITY[1] (dg/min) | MELT INDEX | MELT INDEX RATIO (g/cc) | RESIN DENSITY (g/cc) | BULK DENSITY |
|---|---|---|---|---|---|---|---|---|
| 9 | 185 | 4.40 | 172.0 | 218 | 1.98 | 31.7 | 0.9446 | 0.37 |
| 10 | 200 | 4.18 | 192.2 | 225 | 2.34 | 29.5 | 0.9440 | 0.38 |
| 11 | 230 | 5.50 | 199.9 | 204 | 3.05 | 26.4 | 0.9446 | 0.39 |

[1]Units of SPECIFIC ACTIVITY are kg/g Ti/hr/(mole/l) of ethylene concentration.

TABLE 6

| EXAMPLE | ALCOHOL/KETONE TYPE | YIELD (g) | SPECIFIC ACTIVITY[1] | MELT INDEX (dg/min) | MELT INDEX RATIO | RESIN DENSITY (g/cc) | BULK DENSITY (g/cc) |
|---|---|---|---|---|---|---|---|
| 12 | Ethanol | 73.3 | 225 | 0.73 | 19.5 | 0.9463 | 0.31 |
| 13 | 2-propanol | 49.3 | 154 | 0.85 | 26.7 | 0.9463 | 0.22 |
| 14 | 1-hexanol | 30.8 | 100 | 0.68 | 23.3 | 0.9491 | 0.19 |
| 15 | Acetone | 32.3 | 105 | 0.49 | 33.3 | 0.9480 | 0.32 |
| 16 | 1,6-Hexanediol/1-butanol | 98.2 | 311 | 1.50 | 25.6 | 0.9422 | 0.36 |

[1]Units of SPECIFIC ACITIVITY are kg/g Ti/hr/(mole/l) of ethylene concentration.

TABLE 7

| EXAMPLE | YIELD (g) | SPECIFIC ACTIVITY[1] | MELT INDEX (dg/min) | MELT INDEX RATIO | RESIN DENSITY (g/cc) | BULK DENSITY (g/cc) |
|---|---|---|---|---|---|---|
| 17 | 139.0 | 492 | 1.79 | 25.9 | 0.9431 | 0.38 |
| 18 | 147.4 | 520 | 1.72 | 26.6 | 0.9419 | 0.35 |
| Comparative Ex. 4 | 18.1 | 57 | 0.41 | 25.8 | 0.9472 | 0.31 |
| 19 | 54.6 | 272.4 | 1.53 | 25.9 | 0.9355 | 0.33 |

[1]Units of SPECIFIC ACTIVITY are kg/g Ti/hr/(mole/l) of ethylene concentration.

What is claimed is:

1. A process for the polymerization of ethylene and alpha-olefins having from 1 to 20 carbon atoms or mixtures of ethylene, alpha-olefins and diolefins, which process comprises polymerizing in the presence of a catalyst system comprising (a) an organo aluminum compound of the formula $AIR''_n X''_{3-n}$ wherein $R''$ is hydrogen or a hydrocarbyl group having from 1 to 20 carbon atoms, X is halogen and n is a number from 1 to 3, and (b) a transition metal containing catalyst component comprising the solid reaction product obtained by treating an inert solid support material in an inert solvent sequentially with (A) an organometallic compound of a Group IIa, IIb or IIIa metal wherein all the metal valencies are satisfied with a hydrocarbon group, (B) an oxygen containing compound selected from ketones, aldehydes, alcohols, siloxanes or mixtures thereof, (C) optionally one or more halogen containing compounds selected from chlorosilanes and/or $Cl_2$, $Br_2$ or interhalogens, (D) at least one transition metal compound of a Group IVb, Vb, VIb or VIII metal, (E) optionally $Cl_2$, $Br_2$ or an interhalogen, and (F) treating the transition metal containing component with an organometallic compound of a Group IIa, IIb or IIIa metal, with the proviso that if a chlorosilane is not employed in step (C), then $Cl_2$, $Br_2$ or an interhalogen is employed in at least one of steps (C) or (E), if a chlorosilane is employed in step (C), then $Cl_2$, $Br_2$ or an interhalogen is additionally employed in step (C) and/or step (E), and with the further proviso that the inert solid support material can also be treated with (i) the (A) organometallic compound and the (B) oxygen containing compound simultaneously, (ii) the reaction product of the (A) organometallic compound and (B) oxygen containing compound or (iii) the (B) oxygen containing compound followed by treating with the (A) organometallic compound.

2. The process as in claim 1 wherein the (A) organometallic compound is a dihydrocarbon magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups, the (B) oxygen containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalkyl group, aralkyl group, alkadienyl group or alkenyl group and the (F) organometallic compound is an aluminum alkyl represented by $R_n^6AlX_{3-n}$ wherein X is a halogen, or hydride and $R^6$ is a hydrocarbyl group selected from $C_1$ to $C_{18}$ saturated hydrocarbon and $1 \leq n \leq 3$.

3. The process as in claim 2 wherein the inert solid support material is one of silica, alumina, magnesia or mixtures thereof.

4. The process as in claim 2 wherein $R^1$, $R^2$, $R^3$, $R^4$, $R^5$ and $R^6$ are alkyl groups having from 1 to 10 carbon atoms.

5. The process as in claim 2 wherein $R^1$ and $R^2$ are different.

6. The process as in claim 5 wherein $R^1$, $R^2$ and $R^3$ are alkyl groups having from 1 to 6 carbon atoms.

7. The process as in claim 6 wherein $R^1$ is butyl.

8. The process as in claim 7 wherein $R^2$ is ethyl.

9. The process as in claim 6 wherein $R^1$, $R^2$, $R^3$, $R^4$ and $R^5$ have 1 to 4 carbon atoms.

10. The process as in claim 9 wherein the oxygen containing component is an alcohol.

11. The process as in claim 10 wherein $R^3$ is butyl.

12. The process as in claim 2 wherein n is 3 and $R^6$ is an alkyl group containing from 1 to 8 carbon atoms.

13. The process as in claim 2 wherein the transition metal compound or mixtures thereof is represented by the formula $TrX'_{4-q}(OR^7)_q$, $TrX'_{4-q}R_q^8$, $VOX'_3$ or $VO(OR^7)_3$ wherein Tr is a transition metal, $R^7$ is a hydrocarbyl group having from 1 to 20 carbon atoms, $R^8$ is an alkyl group, aryl group or aralkyl group having from 1 to 20 carbon atoms or a 1,3-cyclopentadienyl, X' is halogen and q is 0 or a number equal to or less than 4.

14. The process as in claim 13 wherein Tr is titanium, vanadium or zirconium.

15. The process as in claim 14 wherein the transition metal compound is $TiCl_4$.

16. The process as in claim 2 wherein chlorosilane is employed in step C.

17. The process as in claim 16 wherein chlorine is employed in step E.

18. The process as in claim 2 wherein chlorine is employed in step C.

19. The process as in claim 17 wherein step C is omitted.

20. The process as in claim 2 wherein the organomagnesium compound and the oxygen containing compound are reacted together prior to contact with the inert support material.

21. The process as in claim 20 wherein the oxygen containing compound is an alkyl alcohol having from 1 to 4 carbon atoms and the magnesium containing compound is ethyl-n-butylmagnesium.

22. The process as in claim 2 wherein the aluminum compound is a trialkyl aluminum wherein the alkyl group has from 1 to 10 carbon atoms.

23. The process as in claim 20 wherein the aluminum alkyl is tri-n-hexyl aluminum.

24. A process for the gas phase polymerization of ethylene and alpha-olefins having from 1 to 20 carbon atoms or mixtures of ethylene, alpha-olefins and diolefins which process comprises polymerizing in the presence of a catalyst system comprising (a) an organoaluminum compound of the formula $AlR''_nX''_{3-n}$ wherein R" is hydrogen or a hydrocarbyl group having from 1 to 20 carbon atoms, X is halogen and n is a number from 1 to 3, and (b) a transition metal containing catalyst component comprising the solid reaction product obtained by treating a solid support material in an inert solvent sequentially with (A) a dihydrocarbon magnesium compound represented by $R^1MgR^2$ wherein $R^1$ and $R^2$, which can be the same or different, are selected from alkyl groups, aryl groups, cycloalkyl groups, aralkyl groups, alkadienyl groups or alkenyl groups, (B) an alcohol, (C) optionally one or more halogen containing compounds selected from $Cl_2$, $Br_2$ or interhalogens, (D) $TiCl_4$, (E) optionally $Cl_2$, $Br_2$ or an interhalogen, and (F) treating the transition metal containing component with an aluminum trialkyl, with the proviso that a $Cl_2$, $Br_2$ or interhalogen is employed in at least one of steps (C) or (E) and with the further proviso that the inert solid support material can also be treated with (i) organomagnesium compound and the (B) alcohol simultaneously, (ii) the reaction product of the (A) organomagnesium compound and (B) alcohol or (iii) the (B) alcohol followed by treating with the (A) organomagnesium compound.

* * * * *